(12) United States Patent
Lardellier

(10) Patent No.: US 7,469,528 B2
(45) Date of Patent: Dec. 30, 2008

(54) AIRCRAFT BRAKING METHOD AND DUCTED FAN JET ENGINE FOR IMPLEMENTING THE METHOD

(75) Inventor: Alain Marie Joseph Lardellier, Melun (FR)

(73) Assignee: Snecma, Paris (FR)

( * ) Notice: Subject to any disclaimer, the term of this patent is extended or adjusted under 35 U.S.C. 154(b) by 403 days.

(21) Appl. No.: 11/155,511

(22) Filed: Jun. 20, 2005

(65) Prior Publication Data

US 2005/0279081 A1   Dec. 22, 2005

(30) Foreign Application Priority Data

Jun. 21, 2004   (FR) .................................. 04 06697

(51) Int. Cl.
*F02K 1/00* (2006.01)
*F02K 1/64* (2006.01)

(52) U.S. Cl. .......................... 60/204; 60/226.2; 60/230; 239/265.25; 239/265.27

(58) Field of Classification Search ................ 60/226.2, 60/230, 204; 244/110 B; 239/265.25, 265.27
See application file for complete search history.

(56) References Cited

U.S. PATENT DOCUMENTS 3,620,022 A   11/1971  Beale
3,747,341 A * 7/1973  Davis ........................ 60/226.2
3,875,742 A * 4/1975  McMurtry et al. ......... 60/226.2
4,485,970 A   12/1984 Fournier et al.
4,541,237 A * 9/1985  Dickey .................... 60/39.281
5,315,821 A * 5/1994  Dunbar et al. ............. 60/226.2

FOREIGN PATENT DOCUMENTS

GB           1 388 406        3/1975

\* cited by examiner

*Primary Examiner*—Ted Kim
(74) *Attorney, Agent, or Firm*—Oblon, Spivak, McClelland, Maier & Neustadt, P.C.

(57) ABSTRACT

The braking method for an aircraft propelled by at least one ducted fan jet engine, the latter comprising a fan, a jet engine core in which the primary flow circulates, a secondary flow exhaust nozzle, encased in a nacelle, comprises the step, in low-power operation, of unloading at least part of the secondary flow so as to reduce the residual thrust of the jet engine without producing any thrust. With the method of the invention, aircraft braking can be achieved without any thrust reverser device using the braking force generated by the drag of the jet engine or engines completed by reduction of residual thrust by unloading the secondary flow.

15 Claims, 2 Drawing Sheets

AIRCRAFT BRAKING METHOD AND DUCTED FAN JET ENGINE FOR IMPLEMENTING THE METHOD

BACKGROUND

I. Field of the Invention

The invention concerns an aircraft braking method and a ducted fan jet engine for implementing the method.

II. Description of Related Art

In civil aviation, the jet engines used are generally so-called ducted fan jet engines. From downstream to upstream, in the direction of the gas stream, they comprise a fan, one or more compressor stages, a combustion chamber, one or more turbine stages and an exhaust nozzle. Part of the air stream driven by the fan, called primary flow or hot flow, is driven towards those parts of the jet engine core listed above. The remainder of the air stream, called secondary flow or cold flow, is directly ejected at the outlet of the fan into a secondary exhaust nozzle located between the outer case of the jet engine core and the engine nacelle. Part of the secondary flow may possibly be re-injected into the primary flow for cooling purposes for example, but the major part of this secondary flow is only used to obtain jet engine thrust. With ducted fan jet engines for civil use, the turbofan thrust is mainly derived from the secondary flow.

At the rear part of their nacelle, jet engines have thrust reversers used during the landing phase to cause thrust in the opposite direction to the aircraft's motion and to facilitate its braking. Thrust reversers are in the form of flaps possibly arranged radially in the secondary flow and oriented, outwardly, towards upstream of the jet engine in order to cause the encountered air stream to move towards upstream of the jet engine, thereby reversing the thrust produced.

On aircraft landing, firstly the power of the jet engine is reduced to enable the aircraft to touch down, then the thrust reversers are set in operation and engine power is subsequently increased to increase the counter-thrust produced by the reversers.

These thrust reversing devices used for braking an aircraft have disadvantages. Firstly they are heavy and complex, which is all the more detrimental when positioned at the rear of the jet engine, creating an overhang with respect to the engine mounting plane on the wing of the aircraft. In addition, reduction in engine power followed by increased throttling lead to high fuel consumption on landing. Mechanical stresses on the jet engine parts at the time of thrust reversion are high. The fan in particular has its lifetime reduced on account of operations using thrust reversers. Finally, landing procedure is relatively complex with the succession of engine power reductions and increases.

The present invention sets out to overcome these disadvantages.

BRIEF SUMMARY

The bypass ratio is defined as the ratio between the secondary flow rate and the primary flow rate. The jet engines used in civil aviation tend towards increasingly higher bypass ratios in an effort to improve fuel consumption and to reduce jet engine noise. Jet engines with a high bypass ratio generally have a fan of large diameter which therefore generates strong drag which may be used to brake the aircraft when the jet engines are operating at low power.

However, during landing roll-out, when the aircraft speed is slow, the braking force related to drag is low since drag is dependent upon speed. Also, in this case, the fan continues to generate thrust which, even when functioning at low power, is too high to enable the aircraft to come to a halt. A method and system are therefore needed enabling the aircraft to brake, including during this last phase.

For this purpose, the invention concerns a method for braking an aircraft propelled by at least one ducted fan jet engine, the latter comprising a fan, a jet engine core in which the primary flow circulates, an exhaust nozzle for the secondary flow, encased by a nacelle, in which, in low-power operation, at least part of the secondary flow is unloaded so as to reduce the residual thrust of the jet engine without producing any thrust.

With the method of the invention, aircraft braking can be achieved, without any thrust reversing device, using the braking force generated by the drag of the jet engine or engines, completed by a reduction in residual thrust through the unloading of the secondary flow whenever necessary, and if possible cancellation of the thrust generated by the secondary flow.

Preferably, the secondary flow is unloaded by opening radial opening means of the nacelle.

Advantageously in this case, the section of the secondary flow exhaust nozzle, downstream of the radial opening means, is obstructed using means for obstructing said nozzle.

The invention also concerns a ducted fan jet engine comprising a fan, a jet engine core in which the primary flow circulates, an exhaust nozzle for the secondary flow, encased in a nacelle, characterized by the fact that it comprises nacelle radial opening means enabling the unloading of at least part of the secondary flow, without producing any thrust.

Preferably, downstream of the radial opening means, the jet engine comprises obstructing means for obstructing the secondary nozzle.

BRIEF DESCRIPTION OF THE DRAWINGS

The invention will be more readily understood through the following description of the preferred embodiment of the jet engine and of the aircraft braking method of the invention, with reference to the appended drawings in which.

DETAILED DESCRIPTION

Figure 1:
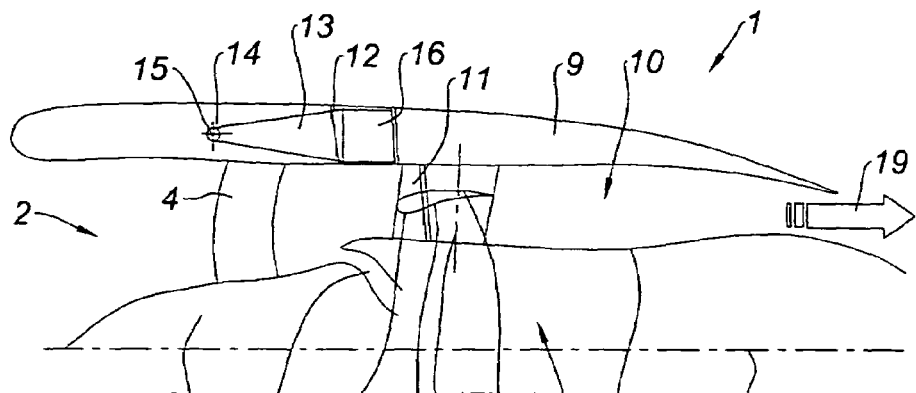
FIG. 1 is a partial, schematic axial section view of an embodiment of a first type of jet engine according to the invention, in flight configuration.
Figure 2:
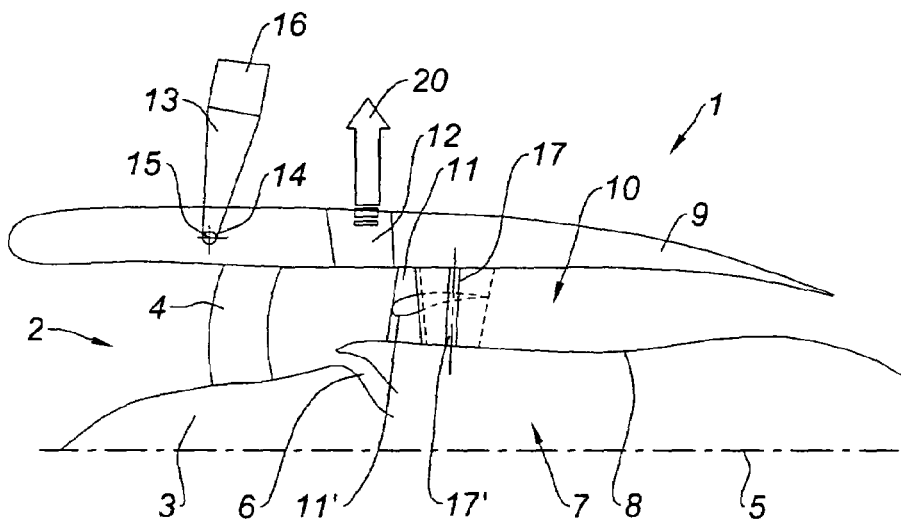
FIG. 2 is a partial, schematic axial section view of the jet engine in FIG. 1, in braking configuration.
Figure 3:
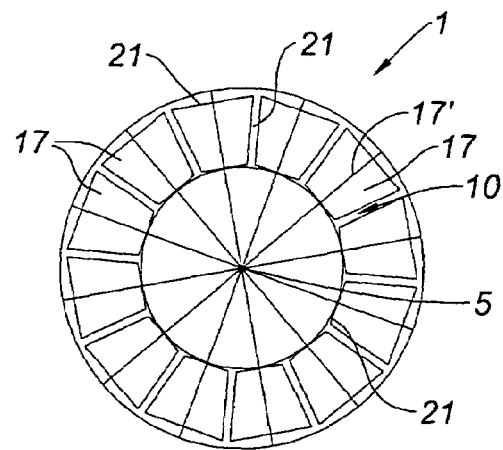
FIG. 3 is a schematic front view of the secondary flow exhaust nozzle of the jet engine in FIG. 2.

FIGS. 1 to 3 illustrate a jet engine 1 with a single upstream fan 2. This fan 2, positioned in the upstream part of the jet engine 1, conventionally comprises a rotor 3, mounted rotationally about the shaft 5 of the jet engine, from which and around which there extends a single series of radial blades 4 all located on the same longitudinal abscissa on shaft 5 of the jet engine 1.

Downstream of blades 4, the jet engine 1 comprises an air access channel 6 to the core 7 of the jet engine 1, positioned just downstream of the rotor 3 of fan 4. The air stream passing through this channel 6 is called the primary flow; this channel 6 shall hereunder be called the primary flow channel 6. The core 7 of the jet engine typically comprises one or more compressor stages, a combustion chamber, one or more turbine stages and an exhaust nozzle, not shown. These various elements are encased in a casing 8 which we shall call the jet engine core case 8. The fan 4 is encased in a nacelle 9 which extends upstream and downstream of the fan 4 and encases a large part of the jet engine 1.

The air stream, which does not pass through the primary flow channel 6, passes through a secondary nozzle 10, defined between the jet engine core case 8 and the inner wall of the nacelle 9. It is chiefly this air stream, called secondary flow which provides the thrust to the jet engine 1.

The jet engine 1 has a high bypass ratio, typically 10 or over. Its cross dimensions, i.e. the surface it offers from a front view, on shaft 5, are large.

The nacelle 9 is supported in particular by arms 11, positioned downstream of the inlet to the primary flow channel 6, and extending radially between the jet engine core case 8 and the inner wall of the nacelle 9. The nacelle 9, upstream of these arms 11 and downstream of the blades 4 of fan 2, comprises at least one orifice 12 which may be closed or opened by a corresponding mobile arm 13, hereinafter designated door 13.

Door 13 is in the form of an arm, of which one end 14 is fixed to a pin 15 integral with nacelle 9 and extending perpendicularly to shaft 5 of the jet engine 1. Door 13 is mounted rotationally mobile in an axial plane about this pin 15. Its free end 16 is conformed to come and close orifice 12 when door 13 is lowered. When door 13 is lifted, the orifice 12 is open and the door 13 extends substantially along a transverse plane of the jet engine 1.

By lowering or lifting door 13 it is meant that it is oriented or displaced inwardly or outwardly of the jet engine 1 respectively, independently of the angular position of door 13 on the nacelle 9.

In the embodiment of the jet engine 1 described FIGS. 1 to 3, the jet engine 1 comprises two orifices 12 and two corresponding doors 13. The two orifices 12 are diametrically opposite, positioned so that when the jet engine 1 is mounted on an aircraft they are located in a plane parallel to the plane of the aircraft wings.

The jet engine 1, just downstream of arms 11 supporting nacelle 9, comprises profiled panels 17 extending radially, globally along an axis 17' between the jet engine core case 8 and the nacelle 9.

FIG. 1, inside arms 11 and panels 17, gives a section view 11' and 18 respectively of these elements along a plane transversal to the radial axis along which they extend. It can be seen that the panels 17 are profiled so as to complete the profile of arms 11 and to form with them a profile comparable to that of a blade. They thereby together ensure a guiding, directing and rectifying function for the secondary air flow in the secondary nozzle 10.

The profiled panels 17 are rotationally mounted about their axis 17'. It is therefore possible, with reference to FIG. 2, to cause them to pivot 90° about their axis 17' to bring them so that they extend transversely to shaft 5 of the jet engine 1. In FIG. 2, the dotted lines show the position of the panels and their cross-sectional view of FIG. 1, and the solid lines show the position of the panels 17 after pivoting. FIG. 3 shows that once pivoting has occurred, the panels form obstacles in the secondary nozzle and thereby ensure an obstructing function for the secondary nozzle. This pivoting may be set in operation by separate motors or by a single motor linked to a movement transmission mechanism, not shown, well known to persons skilled in the art.

The operation of the jet engine with a single upstream fan shown FIGS. 1 to 3, during the aircraft braking method of the invention, will now be described in more detail.

In FIG. 1, the jet engine 1 is in flight configuration. Doors 13 are lowered, i.e. orifices 12 are closed and panels 17 are oriented so as to complete the profile of arms 11 and direct the air flow. In this configuration, the secondary air flow, schematised by arrow 19, flows in the secondary nozzle 10 and provides a large part of the thrust for jet engine 1.

During the aircraft's landing phase, the power of the jet engine 1 is reduced to reduce thrust and allow the aircraft to touch down. After landing, the aircraft must be braked. This braking was ensured in the prior art by thrust reversing devices.

Owing to its large cross dimensions, and on account of aircraft speed and motion in air, the jet engine 1 generates strong drag which translates as a force opposing the movement of the aircraft. For jet engines with a bypass ratio of 10 or over, the braking force related to drag is sufficiently high, with reduced jet engine 1 power, to slow down the aircraft sufficiently once it has landed. However, during landing rollout when the aircraft speed is low, the braking force related to drag is also low. In addition, in this case the fan continues to generate thrust which, even during low-power operation, is too high to enable the aircraft to come to a halt.

Unloading of the secondary air flow is then set in operation. The doors 13 are lifted, i.e. the orifices 12 are opened, allowing the secondary air flow to escape via orifices 12. The thrust of the jet engine 1 is thereby reduced. Panels 17 are then caused to pivot about their axis 17' so that they extend transversely to shaft 5 of the jet engine, as in FIG. 3, and obstruct the secondary exhaust nozzle.

In practice, it is possible not to wait until the aircraft has slowed down to take advantage of the braking allowed by the jet engine 1. In this case the doors 13 are lifted and the panels 17 are pivoted into obstruction position as soon as the aircraft wheels have touched the ground.

In this configuration, the thrust of the secondary air flow is cancelled, or at least is largely reduced, since the air flow blocked by panels 17 escapes freely via orifices 12 located just upstream of the latter, as shown by arrow 20 in FIG. 2. It is therefore unloading of the air flow that is involved. No thrust is created. The residual thrust of the jet engine 1 is reduced to the sole thrust of the residual primary air flow, totally or at least to a large extent. In addition, since the jet engine is operating at low power, the stresses on the panels 17 are not high; the panels were only caused to pivot once doors 13 had been opened. Moreover, the stresses are well transmitted since orifices 12 and panels 17 are located in the vicinity of arms 11 which are part of the fixed structure of the jet engine 1. Typically, the orifices 12 have an unloading surface (surface calculated on the inner wall of nacelle 9) representing approximately 10% of the section of the secondary exhaust nozzle on the abscissa of orifices 12, or at least a sufficient surface area to allow the unrestricted flow of the secondary air stream from the fan operating at low power.

In addition to allowing the unloading of the secondary air flow via orifices 12 and reducing the thrust of the secondary air flow, the doors 13 when they extend transversely to shaft 5 of the jet engine 1, fulfil an airbrake function and thereby contribute an additional participation in the braking of the aircraft.

It can be seen in FIG. 3 that leak passages 21 may exist between the panels 17. These leak passages 21 must be made as small as possible and are then non-detrimental since the channel defined by the secondary exhaust nozzle 10 is largely closed, the air stream having little or no propensity to rush into leak passages 21 since the orifices 12 are located just upstream of the latter. In addition, the residual thrust derived from the primary air flow, during low-power operation, is not sufficient to impede the braking of the aircraft.

Therefore, with the jet engine 1 of the invention, it is possible to ensure braking of the aircraft using the drag force generated by the front surface offered by the fan 2. Orifices 12 are open and panels 17 are pivoted at an ad hoc time of the braking process for maximum reduction of the residual thrust related to the low-power operating of fan 2. The operation is ensured almost without any constraints, since no thrust is generated, the air escaping freely via orifices 12. A few stresses exist it is true on panels 17 blocking the secondary air flow and repelling it towards orifices 12, and on doors 13 which ensure an airbrake function, but they are negligible compared with the stresses which could be incurred by a thrust reverser device. Finally, the entire braking process is conducted with the fan 2 operating at low power, thereby simplifying the system for the pilot, reducing fuel consumption and wear of the engine since its power is not increased at the end of the process, as was the case with thrust reverser devices.

A further implementation of the invention, on a different type of jet engine, is now described in connection with FIGS. 4 and 5.

Figure 4:
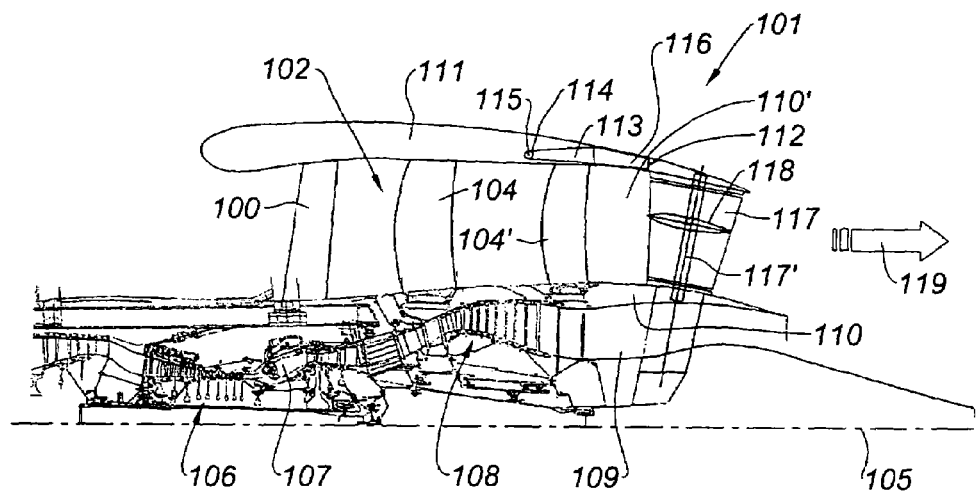
FIG. 4 is a partial, schematic axial section view of an embodiment of a second type of jet engine according to the invention, in flight configuration.
Figure 5:
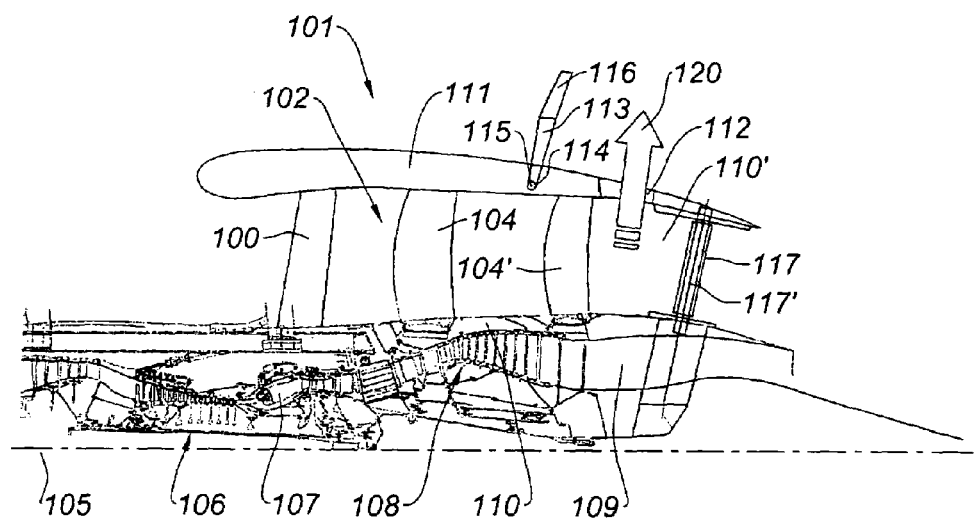
FIG. 5 is a partial, schematic axial section view of the jet engine in FIG. 4, in braking configuration.

FIGS. 4 and 5 show a jet engine 101 with a twin downstream fan 102. This fan 102, positioned in the downstream part of the jet engine 101, conventionally comprises two series of radial blades 104, 104', the blades 104, 104' of one same series being positioned on the same longitudinal abscissa on shaft 105 of the jet engine 101. Blades 104, 104' rotationally mounted about shaft 105 of the jet engine, generate the secondary air flow providing a large part of the thrust of the jet engine 101.

The primary air flow, which takes its source at the upstream end of the jet engine, successively passes through the compressor stages 106, a combustion chamber 107, turbine stages 108 and an exhaust nozzle 109 in particular. All these elements of the jet engine core are encased in a casing 110, hereunder called the jet engine core case 110.

Blades 104, 104' are rotationally mounted about the jet engine core case 110, and are driven in rotation by the rotation of the turbine stages 108. They are encased in a nacelle 111. Arms 100 are arranged upstream of blades 104, 104' to support nacelle 111 and to guide and direct the air towards the fan 102.

As previously nacelle 111, downstream of the series of downstream blades 104', defines a secondary exhaust nozzle 110' to guide the secondary air flow. This secondary nozzle 110' is axially less extensive than previously, since the blades 104, 104' are located in the downstream part of the jet engine 101. The jet engine 101 has a high bypass ratio, typically 10 or over, and a large frontal surface, i.e. the surface generated by fan 102 and jet engine 101 as seen from a front view on shaft 105 of the jet engine, therefore creating strong drag.

Nacelle 111, downstream of the series of downstream blades 104', comprises at least one orifice 112 which can be closed or opened by a corresponding mobile arm 113 hereinafter called door 113. The end 114 of door 113 is fixed to a pin 115 integral with the nacelle 111, which extends perpendicular to the shaft 105 of the jet engine 101. Door 113 is mounted rotationally mobile in an axial plane about this pin 115. Its free end 116 is conformed to come and close orifice 112 when door 113 is lowered and to open it when the door is lifted, door 113 then extending substantially along a transverse plane of the jet engine 101. The jet engine 101 here comprises two orifices and two corresponding doors 113, diametrically opposite.

The jet engine 101, downstream of doors 113 and here at the outlet of the secondary nozzle 110', comprises profiled panels 117 extending radially and globally along an axis 117', between the jet engine core case 110 and the nacelle 111.

FIG. 4, inside panels 117, gives a cross-sectional view 118 of these elements, in a plane transversal to the radial axis 117' along which they extend. It can be seen that panels 117 are profiled to form a profile comparable to that of a blade thereby ensuring a guiding, directing and rectifying function for the secondary air flow leaving the secondary nozzle 110'.

Profiled panels 117 are mounted rotationally about their axis 117'. It is therefore possible, as previously and with reference to FIG. 5, to cause them to pivot 90° about their axis 117' so that they extend transversely to shaft 105 of the jet engine 101.

The operation of the jet engine with twin downstream fan shown FIGS. 4 and 5, during the aircraft braking method of the invention, is similar in every point to that of the jet engine with a single upstream fan.

With reference to FIG. 4, in flight configuration, doors 113 are lowered, i.e. orifices 112 are closed and panels 117 are oriented so as to direct the secondary air flow, schematised by arrow 119, towards the exit of secondary nozzle 110'.

During the aircraft's landing phase, jet engine 101 is decelerated to reduce its thrust and enable the aircraft to touch down. After landing, as previously the aircraft is braked by means of the drag generated by the large diameter of fan 102 which is operating at low power.

During the landing run, the secondary air flow is unloaded. Doors 113 are lifted, i.e. orifices 112 are opened allowing the secondary air flow to escape via orifices 112, and panels 117 are then caused to pivot about their axis 117' so that they extend transversely to shaft 105 of the jet engine in comparable manner to FIG. 3.

In this braking configuration, the thrust of the secondary air flow is largely reduced. The secondary air flow, blocked by panels 117, escapes freely via orifices 112 as shown by arrow 120 in FIG. 5, without producing any thrust. Typically, orifices 112 have an unloading surface representing approximately 10% of the section of the secondary nozzle on the abscissa of orifices 112. Doors 113, deployed radially outside nacelle 111, also fulfil an airbrake function, increasing the drag force of the jet engine and thereby facilitating braking.

The invention has been presented in connection with two types of different jet engines. It evidently applies to any type of jet engine comprising a fan, whether this fan is single, twin or more, downstream, upstream, contra-rotational. . . Irrespective of the type of jet engine, the assembly formed by doors 13, 113 and panels 17, 117 is positioned downstream of the fan to enable unloading of the secondary air flow during the aircraft braking phase.

A further function of panels 17, 117 is now described. It applies to jet engines whose bypass ratio is 13 or over. In this type of jet engine, between the take-off phase and cruising phase, it is necessary to reduce the section of the secondary exhaust nozzle for reasons related to fluid dynamics well known to persons skilled in the art. For this purpose, panels 17, 117 may be caused to pivot a few degrees to reduce the section of the secondary nozzle.

The invention has been presented in connection with doors 13, 113 rotationally mounted and panels 17, 117 that are pivot mounted. However other means could be considered, respectively ensuring a nacelle radial opening function to allow unloading of the secondary air flow without generating thrust, optionally with an airbrake function, and an obstructing function of the secondary nozzle 10, 110' downstream of the opening means. Therefore doors 13, 113 could for example be replaced by sliding panels able to close or open orifices 12, 112. Similarly, pivoting panels 17, 117 could be replaced by sliding panels housed in the nacelle 9, 111 which are lowered into the secondary nozzle 10, 110' when it is decided to obstruct the passage of the secondary air flow.

The invention has also been presented in connection with orifices 12, 112 in nacelle 9, 111, totalling two in number, but evidently a single orifice or a greater number of orifices could be provided.

The invention has further been presented in connection with a braking method for aircraft landing. The invention also applies to any other braking process, for example during aborted take-off. In this case, the method can be somewhat modified. Hence if a take-off is to be aborted, generally very quick action must be taken. As soon as it is decided to abort take-off, the power of the jet engine 1, 101 is reduced, and simultaneously doors 13, 113 are opened. Once the flow rate of the secondary air stream is sufficiently reduced, panels 17, 117' are cause to pivot to obstruct the secondary nozzle 10, 110' and force the air to pass via orifices 12, 112.

The invention claimed is:

1. A method for braking an aircraft propelled by at least one ducted fan jet engine, the jet engine comprising a fan, a jet engine core in which a primary flow circulates, and a secondary flow exhaust nozzle, encased by a nacelle, the method comprising:
    positioning a blocking mechanism to obstruct a secondary flow in the secondary flow exhaust nozzle, the blocking mechanism being located directly downstream from a support member positioned downstream from a radial opening of the nacelle; and
    unloading, in a low-power operation, at least part of the secondary flow through the radial opening by lifting a door that was blocking the radial opening to reduce a residual thrust of the jet engine without producing any thrust, wherein the radial opening is located downstream from an opening of a primary flow channel.

2. The braking method as in claim 1, wherein an entirety of the secondary flow is unloaded so as to reduce the residual thrust of the jet engine to a sole thrust of the primary flow.

3. A ducted fan jet engine, comprising:
    a fan;
    a jet engine core configured to receive a primary flow from the fan via a primary flow channel;
    a secondary flow exhaust nozzle configured to receive a secondary flow from the fan;
    a door
    a nacelle surrounding the secondary flow exhaust nozzle and including radial opening means positioned downstream from the primary flow channel and configured to enable unloading of part of the secondary flow, without producing any thrust, wherein the radial opening means includes at least one orifice that can be closed or opened by the door;
    a support member positioned downstream from the radial opening means and extending between the nacelle and the jet engine core; and
    obstruction means configured to obstruct the secondary flow exhaust nozzle and positioned directly downstream from the support member.

4. The ducted fan jet engine as in claim 3, wherein, when the orifice is opened by the door, the door ensures an airbrake function.

5. The ducted fan jet engine as in claim 3, wherein
    the obstruction means comprise at least one profiled panel extending along a radial axis in the secondary flow exhaust nozzle, and
    the at least one profiled panel is rotationally mounted about the radial axis.

6. The ducted fan jet engine as in claim 5, wherein the profiled panel is profiled to guide, direct, and rectify the secondary flow in the secondary flow exhaust nozzle.

7. The ducted fan jet engine according to claim 5, wherein the at least one profiled panel is configured to be rotated by a few degrees to reduce a section of the secondary flow exhaust nozzle.

8. The ducted fan jet engine as in claim 3, wherein a bypass ratio of the jet engine is 10 or higher.

9. A ducted fan jet engine, comprising:
    a fan configured to produce a primary air flow and a secondary air flow;
    a jet engine core configured to receive the primary air flow via a primary flow channel;
    a secondary flow exhaust nozzle configured to receive the secondary air flow;
    a nacelle surrounding the secondary flow exhaust nozzle and including at least one radial opening positioned downstream from an entrance of the primary flow channel and configured to enable unloading of part of the secondary air flow;
    a door configured to block the at least one radial opening in a first position and configured to be removed from the at least one radial opening in a second position;
    a support member positioned downstream from the at least one radial opening and extending between the nacelle and the jet engine core; and
    an obstruction mechanism configured to obstruct the secondary flow exhaust nozzle and positioned directly downstream from the support member.

10. The ducted fan jet engine according to claim 9, wherein the obstruction mechanism includes a plurality of panels configured to rotate around a radial axis of the jet engine.

11. The ducted fan jet engine according to claim 10, wherein, in an open position, at least one of the panels and the support member overlap and are parallel in a direction of the secondary air flow.

12. The ducted fan jet engine according to claim 10, wherein the plurality of panels are configured to be rotated by a few degrees to reduce a section of the secondary flow exhaust nozzle.

13. The ducted fan jet engine according to claim 9, wherein, in the second position, the door is completely removed from the at least one radial opening such that the door does not influence an air flow path of the secondary air flow exiting through the radial opening.

14. The ducted fan jet engine according to claim 9, wherein, in the second position, the secondary air flow exiting through the at least one radial opening flows in a radial direction from a longitudinal axis of the jet engine.

15. The ducted fan jet engine according to claim 9, wherein the at least one radial opening includes a first radial opening and a second radial opening diametrically opposed to the first radial opening.

* * * * *